Dec. 31, 1946.  G. E. DATH  2,413,295
FRICTION SHOCK ABSORBER
Filed April 27, 1944
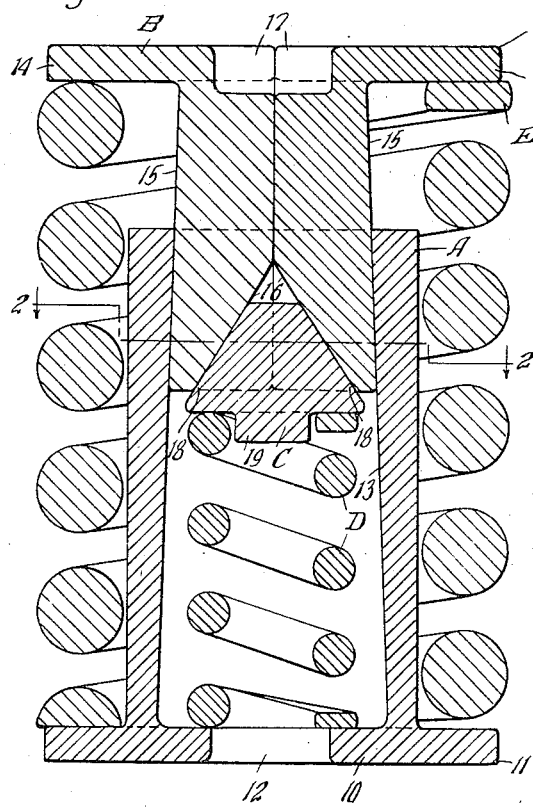
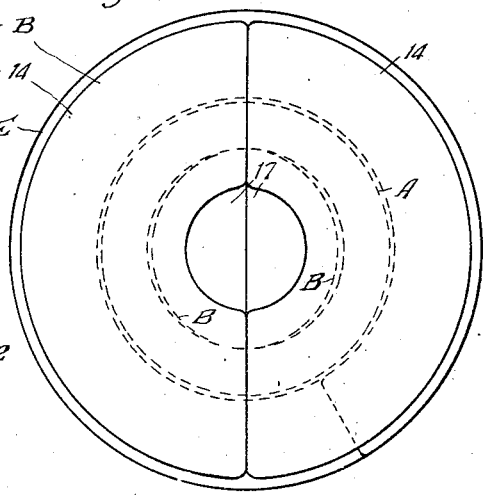
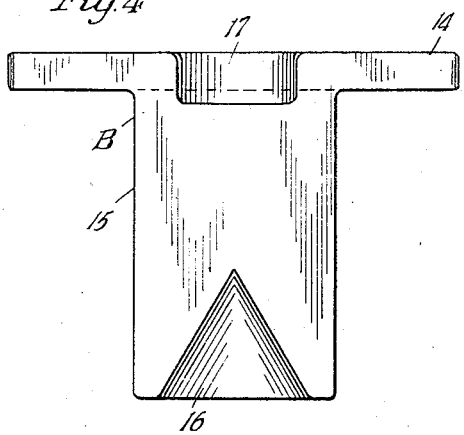
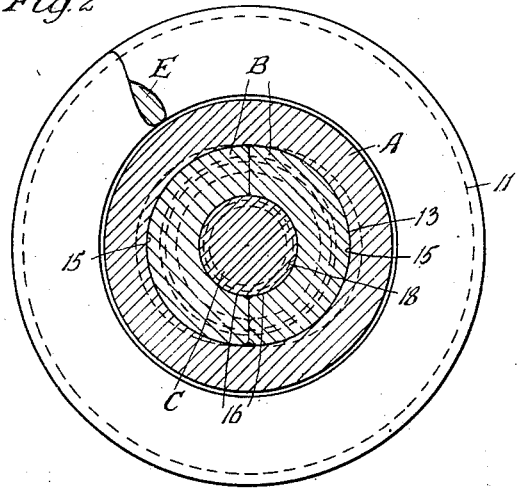
Inventor
George E. Dath
By Henry Fuchs
Atty.

Patented Dec. 31, 1946

2,413,295

UNITED STATES PATENT OFFICE 2,413,295

FRICTION SHOCK ABSORBER

George E. Dath, Chicago, Ill., assignor to W. H. Miner, Inc., Chicago, Ill., a corporation of Delaware Application April 27, 1944, Serial No. 533,011

4 Claims. (Cl. 267—9)

This invention relates to improvements in friction shock absorbers, especially adapted for use with truck springs of railway cars for snubbing or dampening the action of the springs.

One object of the invention is to provide a friction shock absorber for truck springs of railway cars which is effective to snub the recoil action of the truck springs.

A more specific object of the invention is to provide a friction shock absorber for railway car truck springs, comprising a friction casing and a spring resisted clutch telescoped within the casing, wherein the friction casing is outwardly tapered, thereby providing relatively high frictional resistance against outward movement of the clutch to snub the recoil action of the truck springs.

Other objects of the invention will more clearly appear from the description and claims hereinafter following.

In the drawing forming a part of this specification, Figure 1 is a transverse, vertical sectional view of my improved shock absorber. Figure 2 is a transverse horizontal sectional view, corresponding substantially to the line 2—2 of Figure 1. Figure 3 is a top plan view of Figure 1. Figure 4 is a side elevational view of one of the friction shoes of my improved shock absorber, the shoe being that at the left hand side of Figure 1, looking from right to left in said figure.

As shown in the drawing, my improved shock absorber comprises broadly a friction casing A; two friction shoes B—B; a combined wedge and spring follower C; an inner spring resistance D; and an outer spring resistance E.

The friction casing A is in the form of a tubular member open at the upper end and closed at the lower end by a transverse bottom wall 10. The bottom wall 10 is extended laterally outwardly beyond the side walls of the casing and provides an annular follower flange 11 at the bottom of the casing. The wall 10 is provided with a central opening 12 adapted to receive the usual centering projection of the lower spring follower plate of the truck spring cluster. The casing A is interiorly tapered in upward direction being provided with two diametrically opposed, interior, longitudinally extending, transversely curved friction surfaces 13 which are truly cylindrical and converge upwardly or outwardly of the casing.

The friction shoes B—B, which are two in number, are of similar design. Each shoe B has a laterally, outwardly projecting flange 14 at the upper end thereof, which is of semi-annular form. The two flanges 14—14 of the shoes when assembled with the casing together form, in effect, a complete annular follower flange. Each shoe is provided with a longitudinally extending, cylindrical friction surface 15 on the outer side thereof. On the inner side, at the lower or inner end thereof, each shoe is provided with an interior wedge face 16, which is of conical contour. The wedge faces 16—16 of the two shoes diverge inwardly with reference to the casing. At the upper end, the shoes B—B are recessed at the center of the mechanism, as indicated at 17, to provide a seat for the spring centering projection of the upper spring follower plate of the truck spring cluster.

The combined wedge and spring follower C is in the form of a block of frusto-conical shape, having an upwardly converging, conical wedge face 18 engaging the wedge faces 16—16 of the shoes. The block, which forms the combined wedge and spring follower C, has a depending centering projection or boss 19 for the inner spring D.

The spring D, which is in the form of a helical coil, is interposed between the combined wedge and spring follower C and the bottom wall 10 of the casing A. The upper end of the spring D bears on the flat inner end of the combined wedge and spring follower C and the lower end thereof bears directly on the bottom wall 10 of the casing. The spring D is preferably under initial compression.

The outer spring E is also in the form of a helical coil which surrounds the casing A and bears at the top and bottom ends respectively on the flanges 14—14 of the shoes B—B and the follower flange 11 of the casing A.

As clearly shown in Figures 1 and 3, the shoes are in abutment with each other on their inner sides, in the normal full release position of the mechanism, thereby limiting lateral displacement of the shoes toward each other and restricting outward movement of the shoes with respect to the casing due to the wedging action of the shoes against the outwardly converging friction surfaces of the casing, the shoes, in effect, forming a friction unit which functions in the manner of a two-part plug, which, in contracted condition, wedges against the friction surfaces of the casing to prevent separation of the casing and shoes in lengthwise direction.

In assembling the mechanism, the shoes are placed within the casing one in advance of the other, so that they may pass through the contracted outer end portion of the mouth of the casing.

My improved shock absorber is substituted for one or more of the coils of a truck spring cluster, the same being interposed between the top and bottom spring follower plate of said cluster.

The operation of the improved shock absorber is as follows: Upon the spring cluster of the truck of the railway car being compressed between the spring follower plates of said cluster, the shoes B—B are moved inwardly with respect to the casing A, resisted by the spring opposed combined wedge and spring follower C. At the same time the spring E is compressed between the flanges of the shoes and the casing. During this action only slight frictional resistance is produced due to the outward taper of the friction casing.

During recoil of the truck springs, expansion of the spring E and of the spring D returns all of the parts to the normal position shown in Figure 1, the friction shoes sliding outwardly on the friction surfaces of the casing A. Inasmuch as the friction surfaces of the casing A converge upwardly, a differential wedging action is produced between the wedge faces of the shoes and the combined wedge and spring follower C, thereby pressing the shoes tightly against the friction surfaces of the casing to snub the action of the coils of the truck spring cluster.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction casing open at one end and having interior, outwardly converging friction surfaces at said open end; of a friction unit comprising a plurality of friction shoes telescoped within the casing and having longitudinally extending friction surfaces in lengthwise sliding engagement with the friction surfaces of the casing, said shoes abutting each other on their inner sides to limit contraction of the friction unit and thereby restrict outward movement of the shoes with respect to the casing; a combined wedge and spring follower having wedge means engaged between the shoes at the inner ends thereof to spread the same apart; and a spring within the casing yieldingly opposing inward movement of the combined wedge and spring follower.

2. In a friction shock absorber, the combination with a cylindrical friction casing having longitudinally extending, interior, transversely curved, outwardly converging friction surfaces; of a friction unit comprising a plurality of friction shoes telescoped within the casing, said shoes having longitudinally extending, transversely curved friction surfaces on their outer sides slidingly engaging the friction surfaces of the casing, said shoes having inwardly diverging wedge faces at their inner ends on the inner sides thereof, said shoes, in the normal release position of the parts, abutting each other to limit contraction of said friction unit and restricting outward movement of the shoes with respect to the casing; a combined wedge and spring follower having a wedge projection engaged between said shoes, said projection having outwardly converging wedge faces engaged with the wedge faces of the shoes; and a coil spring within the casing opposing inward movement of the combined wedge and spring follower.

3. In a friction shock absorber, the combination with a friction casing open at one end and closed at the other end by an end wall, said casing having outwardly converging, longitudinally extending, opposed, transversely curved, interior friction surfaces at its open end; of a friction unit comprising a pair of friction shoes slidingly telescoped within the casing, said shoes having transversely curved, longitudinally extending friction surfaces on their outer sides slidingly engaging the friction surfaces of the casing, said shoes having wedge faces at their inner ends on the inner sides thereof converging outwardly of the casing, said shoes having flat inner faces in abutment with each other, in the normal full release position of the mechanism, to limit contraction of said friction unit and outward movement of the shoes with respect to the casing; a combined wedge and spring follower having outwardly converging wedge faces engaging the wedge faces of said shoes; and a spring interposed between the inner end of the combined wedge and spring follower and the end wall of the casing.

4. In a friction shock absorber, the combination with a friction casing open at one end and closed at the other end by an end wall, said casing having outwardly converging, longitudinally extending, opposed, transversely curved, interior friction surfaces at its open end, said casing having a follower flange at the closed end thereof; of a friction unit comprising a pair of friction shoes slidingly telescoped within the casing, said shoes having transversely curved, longitudinally extending friction surfaces on their outer sides slidingly engaging the friction surfaces of the casing, said shoes abutting each other on their inner sides, in full release position of the mechanism, to limit contraction of said unit and restrict outward movement of the shoes with respect to the casing, said shoes having wedge faces at their inner ends on the inner sides thereof converging outwardly of the casing, said shoes having laterally outwardly projecting follower flanges at the outer ends thereof; a combined wedge and spring follower having outwardly converging wedge faces engaging the wedge faces of said shoes; a spring interposed between the inner end of the combined wedge and spring follower and the end wall of the casing; and a coil spring surrounding said casing and bearing at opposite ends on the flange of the casing and the flanges of the shoes.

GEORGE E. DATH.